June 21, 1955
H. W. HARMAN
2,711,012
METHOD OF REPAIRING CRACKED CASTING
Filed Sept. 13, 1949
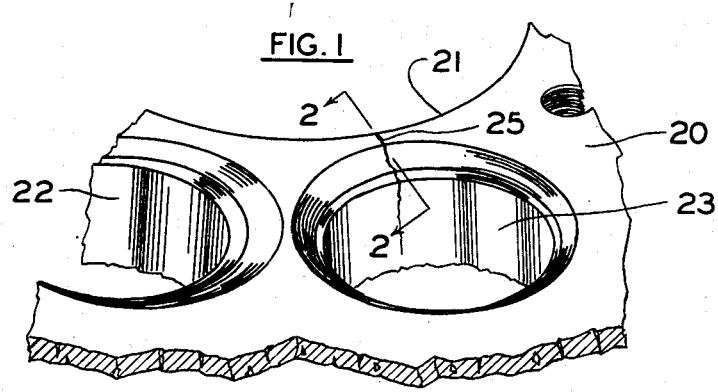
FIG. I
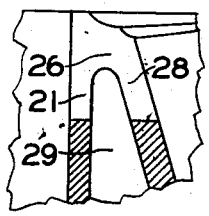
FIG. 2
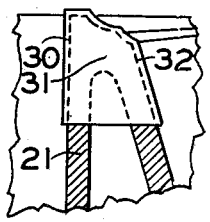
FIG. 3
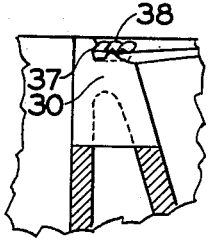
FIG. 4
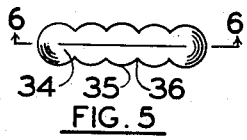
FIG. 5
FIG. 6
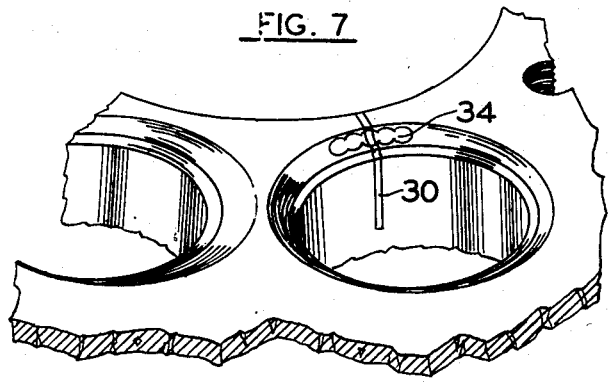
FIG. 7
INVENTOR.
Hal W. Harman
BY Schmieding, Hittson and Huber
his Attorneys United States Patent Office 2,711,012
Patented June 21, 1955

2,711,012

METHOD OF REPAIRING CRACKED CASTING

Hal W. Harman, El Paso, Tex.

Application September 13, 1949, Serial No. 115,371

3 Claims. (Cl. 29—402)

The present invention relates to the method of repairing cracked metals such as castings or forgings.

One of the objects of the present invention is to repair cracked metals such as cracked castings or forgings by a method which includes the steps of substantially obliterating the crack by cutting out, for example, by a saw or other cutting tool, a slot completely across the metal, longitudinally of the crack, then inserting into the slot, a strip of ductile metal having a length and width slightly larger, respectively, than the length and width of the slot and a thickness slightly less than the breadth of the slot, and then tightening the strip in the slot by peening the exposed edges of the strip along the slot.

Another step in the method is to fashion in the cracked and the strip-ductile metals, transversely of said materials, an elongated recess having bulged portions and a connecting restricted portion, then inserting into the recess, a fastener of ductile metal having bulged portions and a restricted portion, which substantially complement the bulged and restricted portions of the recess, and then peening the fastener into locking position with the metal being repaired.

Further objects and advantages of the present invention will be apparent from the following description, reference being had to the accompanying drawings wherein a preferred form of embodiment of the invention is clearly shown.

In the drawings:

Fig. 1 is a fragmentary perspective view of a piece of cracked metal, herein shown, for illustrating the invention as the cylinder of a Ford internal combustion engine, the crack extending between the valve chamber and the cylinder for the piston;

Fig. 2 is a fragmentary sectional view taken on line 2—2 of Fig. 1 after the cut has been made to obliterate the crack;

Fig. 3 is a view similar to Fig. 2 but showing the strip inserted in the slot formed by the cutting tool;

Fig. 4 is a view similar to Fig. 3 but showing the drilled recess;

Fig. 5 is a top plan view of the lock fastener, the lock fastener being shown on a larger scale;

Fig. 6 is a cross sectional view of the line taken on line 6—6 of Fig. 5; and

Fig. 7 is a perspective view similar to Fig. 1 but showing the strip and lock fastener in finished position.

The present invention is applicable to any type of repair of cracked metals where it is possible to utilize a cutting tool, such as, for example a saw, to obliterate the crack. It can be readily used in repairing the crack between the piston cylinder and the valve chamber of internal combustion engines and I have chosen to illustrate one form of the invention in connection with repairing such a crack in an internal combustion engine.

Referring in detail to the drawings, there is shown the upper part 20 of a portion of a cylinder block in which the cylinder for the piston is indicated at 21 and the valve chambers at 22 and 23. Fig. 1 shows a crack 25 extending substantially in a radial direction between the cylinder 21 and the valve chamber 23. To repair the crack, a cut is made longitudinally of the crack 25, removing material on opposite sides of the crack, to form a substantially smooth walled slot 26. This cut may be made, for example, by a saw, an abrading wheel or any suitable slot forming tool. If there is, for example, a water chamber between the wall 28, which forms the valve chamber and the wall 21 of the piston, the cut is made deep enough so that the slot extends beyond the crack portion. This has been done in the illustration shown in Fig. 2 wherein the water chamber is shown at 29.

The next step in the method is to insert a strip of material into the slot 26. In repairing a casting like that here illustrated, the strip is preferably rectangular in shape, slightly longer than the depth of the slot and slightly wider than the width of the widest part of the slot. In Fig. 3, there is shown a strip 30 inserted in position. The dotted line 31 indicates the wall of the cylinder and the dotted line 32 indicating the wall of the valve chamber. The right side of the strip 30 has been ground away or cut in any suitable manner to substantially conform to the outline of the valve chamber. In actual practice, the strip 30 extends a few thousandths of an inch beyond the material adjacent the slot. The strip 30 is formed of ductile metal. It may have a thickness slightly less than the breadth of the slot so that it can be readily placed in position, or may be of a thickness, approximately .004 to .006 of an inch thicker than the breadth of the slot so that intimate metallic contact is maintained throughout the depth of the slot between the side walls of the strip 30 and the side walls of the slot 26. By employing a ductile metal, the minute humps in the side walls of the slot, which are formed by the cutting tool, shear into the side walls of the strip and the portions of the side walls of the strip flow into the dales between the humps.

After the strip 30 is inserted in the slot 26 and the side edges and top edge of the strip are trimmed as, for example, by a grinding wheel so that the strip extends a few thousandths of an inch beyond the walls of the slot, the side edges and the top of the strip are peened preferably by an air hammer so as to crowd the material of the strip into the slot.

Castings are often cracked due to the internal stress in the metal which stress is the result of the cooling of the casting in the manufacture thereof. Quite often after this stress is released through the cracking, the further tendency to crack is completely relieved or the inherent stability of the metal is such that further cracking does not occur. Under certain circumstances, as for example when a casting is subjected to varying temperatures, the cracking may continue due to the expansion or contraction, or both, of the metal. Under such conditions, it is desirable to lock the sections of the casting to prevent further spreading. The present invention also contemplates the locking of the sections across the crack. In order to accomplish this, I employ a lock or locks like that shown in my Patent No. 2,142,896, issued January 3, 1939. Such lock is shown in Figs. 5 and 6 of the instant application wherein the lock is generally shown at 34 having two or more lobe or bulged portions 35, each connected by restricted sections 36. In utilizing this lock, I first drill a hole edgewise into the strip 30 as shown in Fig. 4, the hole being indicated at 37 and then by a suitable drill fixture, such as that disclosed in my copending application Serial No. 785,900, drill one or two holes 38 on opposite sides of the hole 37, the holes 38 adjacent the hole 37 overlapping one another. The hole 37 has a diameter somewhat larger than the width of the strip 30 so that part of the hole extends into the casting on opposite sides of the strip 30. The bulged and restricted portions of the lock or fastener 35 substantially complement the bulged and restricted portions of the recess formed by the holes 37 and 38. The lock 35 is then inserted in the recess and peened in position, preferably with an air hammer. If the spreading or collapsing tension of the casting requires more tensile strength than is afforded by one of the locks 35, then a plurality of recesses and locks is employed, or, it may be desirable to superimpose one lock upon another in the same recess in which event they will be in laminated form. Also, in this event each lock is inserted individually and individually peened in position before the next lock is employed.

Preferably the tensile strength of the lock is higher than the tensile strength of the metal being repaired and by cold working the locks during the peening operation, sufficient tensile strength is restored to the casting so that it equals or more than equals the tensile strength of the original metal. I have found that one lock is sufficient to prevent any spreading or contracting of the casting when here employed in the cylinder block of a Ford V-8 engine.

My employing the strip in the slot as herein disclosed, I prevent any leakage and the lock prevents any spreading or contracting of the metal on opposite sides of the slot.

While the form of embodiment of the present invention as herein disclosed constitutes a preferred form, it is to be understood that other forms might be adopted, all coming within the scope of the claims which follow.

I claim:

1. The method of repairing cracked castings such as cylinder heads and engine blocks having a crack extending substantially in a radial direction from a cylinder or valve chamber, which comprises, substantially obliterating the crack by cutting out a substantially smooth wall slot having side walls straight and parallel to each other and extending substantially the full depth of the crack, on opposite sides of the crack and longitudinally of the crack; inserting into the slot, a strip of ductile metal having a length and width slightly larger, respectively, than the length and width of the slot and having a thickness substantially equal to the breadth of the slot; then tightening the strip in the slot by peening those portions of the metal of the strip which extends beyond the metal being repaired; fashioning in the cracked and ductile metals, transversely of said materials on at least one side of the crack, an elongated recess; then inserting into the recess a fastener of ductile metal filling the recess; and then peening the fastener into locking position.

2. The method of repairing cracked castings such as cylinder heads and engine blocks having a crack extending substantially in a radial direction from a cylinder or valve chamber, which comprises, substantially obliterating the crack by cutting out a substantially smooth wall slot having side walls straight and parallel to each other and extending substantially the full depth of the crack, on opposite sides of the crack and longitudinally of the crack; inserting into the slot, a strip of ductile metal having a length and width slightly larger, respectively, than the length and width of the slot and having a thickness substantially equal to the breadth of the slot; then tightening the strip in the slot by peening those portions of the metal of the strip which extend beyond the metal being repaired; fashioning in the cracked and ductile metals, transversely of said materials on opposite sides of the crack, an elongated recess; then inserting into the recess a fastener of ductile metal filling the recess; and then peening the fastener into locking position.

3. The method of repairing cracked castings such as cylinder heads and engine blocks having a crack extending substantially in a radial direction from a cylinder or valve chamber, which comprises, substantially obliterating the crack by cutting out a substantially smooth wall slot extending substantially the full depth of the crack, on opposite sides of the crack and longitudinally of the crack; driving into the slot a strip of ductile metal having a length and width slightly larger, respectively, than the length and width of the slot and having a thickness slightly larger than the breadth of the slot; fashioning in the cracked and ductile metals, transversely of said materials on opposite sides of the crack, an elongated recess having bulged portions and a connecting restricted portion; then inserting into the recess a fastener of ductile metal having bulged and restricted portions substantially complementing the bulged and restricted portions of the recess; and then peening the fastener into locking position.

References Cited in the file of this patent

UNITED STATES PATENTS

| | | |
|---|---|---|
| 1,322,245 | Klassen | Nov. 18, 1919 |
| 1,397,167 | Hopper | Nov. 15, 1921 |
| 1,989,695 | Jensen | Feb. 5, 1935 |
| 2,011,484 | Harman | Aug. 13, 1935 |
| 2,142,896 | Harman | Jan. 3, 1939 |
| 2,191,485 | Jensen | Feb. 27, 1940 |
| 2,198,167 | Harman | Apr. 23, 1940 |
| 2,252,986 | Scott | Aug. 19, 1941 |
| 2,291,162 | Kirby | July 28, 1942 |
| 2,506,233 | Murphy | May 2, 1950 |
| 2,537,533 | Ingalls | Jan. 9, 1951 |